(12) United States Patent
Welsh (10) Patent No.: US 6,276,298 B1
(45) Date of Patent: Aug. 21, 2001

(54) SOLAR FEEDER

(76) Inventor: Edward M Welsh, 623-B Fountain St., Greensboro, NC (US) 27403

( * ) Notice: Subject to any disclaimer, the term of this patent is extended or adjusted under 35 U.S.C. 154(b) by 0 days.

(21) Appl. No.: 09/478,926

(22) Filed: Jan. 6, 2000

Related U.S. Application Data (60) Provisional application No. 60/115,181, filed on Jan. 8, 1999.

(51) Int. Cl.[7] ............................... A01K 5/00; A01K 39/01
(52) U.S. Cl. ........................................................ 119/52.3
(58) Field of Search .................................. 119/52.2, 52.3, 119/52.4, 57.8, 57.9

(56) References Cited

U.S. PATENT DOCUMENTS

| | | | |
|---|---|---|---|
| 5,150,665 | * | 9/1992 | Boaz .................................... 119/52.3 |
| 5,191,857 | * | 3/1993 | Boaz .................................... 119/57.9 |
| 5,285,747 | * | 2/1994 | Caldine ................................ 119/57.9 |
| 5,471,951 | * | 12/1995 | Collins ................................ 119/57.9 |
| 5,878,537 | * | 3/1999 | Flischel ............................... 119/57.9 |
| 5,937,788 | * | 8/1999 | Boyd ................................... 119/57.9 |

* cited by examiner

*Primary Examiner*—Thomas Price (57) ABSTRACT

A solar powered squirrel proof bird feeder delivers a mild shock to a squirrel without delivering a shock to a bird using the feeder. Two copper tubes extending adjacent a feed tray provide a perch for birds. However, a squirrel would normally come into contact with both of the spaced apart tubes, and since a potential difference is established between the two copper tubes, a squirrel will be shocked. A solar panel and a battery are employed to charge a capacitor which establishes the voltage difference. A roof of the bird feeder is also charged relative to one of the tubes. Even if a bird were to come into contact with electrically conductive surfaces at different potential, the relatively low moisture content of a bird will prevent a circuit from being completed, thus preventing the birds from being shocked.

12 Claims, 13 Drawing Sheets

SOLAR FEEDER

CROSS REFERENCE TO PENDING PROVISIONAL PATENT APPLICATION

Applicant claims benefit of the filing date of pending provisional patent application Ser. No. 60/115,181 filed Jan. 8, 1999.

BACKGROUND OF THE INVENTION

1. Field of the Invention

This invention is related to squirrel proof bird feeders and includes an electrical circuit for delivering a mild shock to a squirrel attempting to eat seed from the bird feeder. This invention is also related to bird feeders that employ a solar panel to provide electrical power.

2. Description of the Prior Art

This invention is believed to take advantage of certain differences between the physiology of birds and squirrels so that a mild electrical shock can be delivered to squirrels and not to birds in a manner that is believed to differ from the prior art.

SUMMARY OF THE INVENTION

In summation I feel the design of the Solar feeder is unique in the following respects.

1) The unique way of delivering a shock via the parallel conductor/roof method enables me to radically alter the architecture of the bird feeder. Since the only place a squirrel can stand, is on the metal roof (where he can cause no damage as a result of chewing or scratching) I don't have to concern myself with how a squirrel might cause harm to the feeder. Because as soon as the squirrel comes in contact with the "feed tray" he completes the circuit. Which means I don't have to employ passive methods like shields or guards or mechanical methods based on weight and moving parts, all of which place design constraints on the designer. This parallel conductor/roof method will enable me to create radically new and different designs which squirrels will be unable to damage as a result of chewing or scratching.

2) The electronics of the feeder is unique in the respect that it is solar powered as well as battery powered. In addition the charge is delivered via a charged capacitor which delivers a short duration DC pulse rather than a pulsating continuous DC voltage or a continuous AC voltage. The electronics also has a test indicator L.E.D. which tells the user when it is charged.

A bird feeder in accordance with this invention includes a seed compartment fabricated from an electrically nonconductive material. A feed tray is located at the bottom of the seed compartment. The feed tray collects seed in the seed compartment provides access for birds to eat the seed. Two spaced apart electrically conductive members are positioned adjacent to the feed tray and positioned to provide a platform for birds as the bird eat the seed in the seed tray. The trays are spaced apart by a distance sufficient so that one of the spaced apart electrically conductive members can support a bird, but being spaced close enough so that a squirrel would contact both electrically conductive members. A solar panel and a battery provide a source of electrical energy connected to at least one of the spaced apart electrically members and comprises means for establishing a voltage difference between the two electrically conductive members, the voltage being sufficient to deliver an electrical.

DETAILED DESCRIPTION OF THE PREFERRED EMBODIMENT

Figure 1:
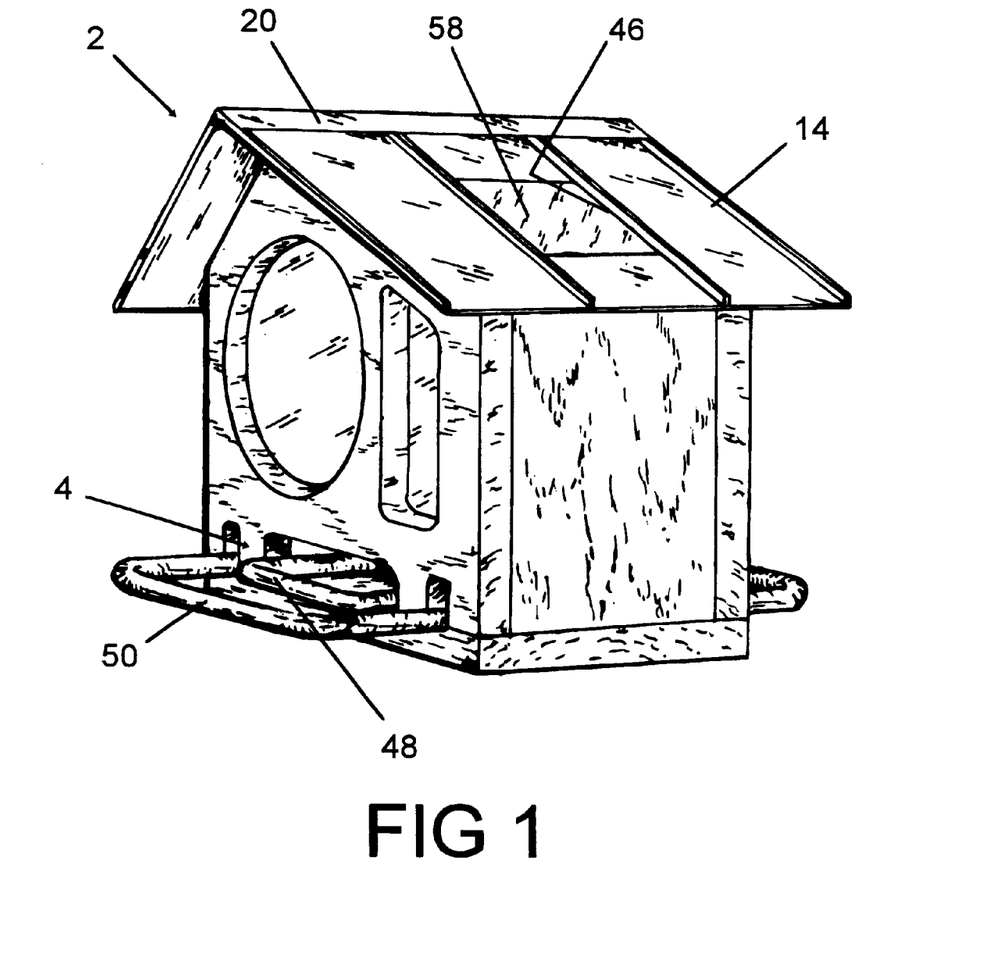
FIG. 1 is a perspective view of a bird feeder showing the copper tubes.

The solar feeder is shown in FIG. 1.

Product: Extremely squirrel-resistant, hand-crafted bird feeder 2.

Specs: Uses solar-powered, battery backed-up circuitry 54 and exterior copper tubinG/sheeting to give squirrels a mild deterrent shock.

Materials: UV-resistant water resistant Western Red Cedar, raised-seam copper roof 14, copper feed tray 8, and copper trim, plus impact-resistant polycarbonate windows 10, 12. Uses recycled electronics and Siemens solar collector.

Figure 2A:
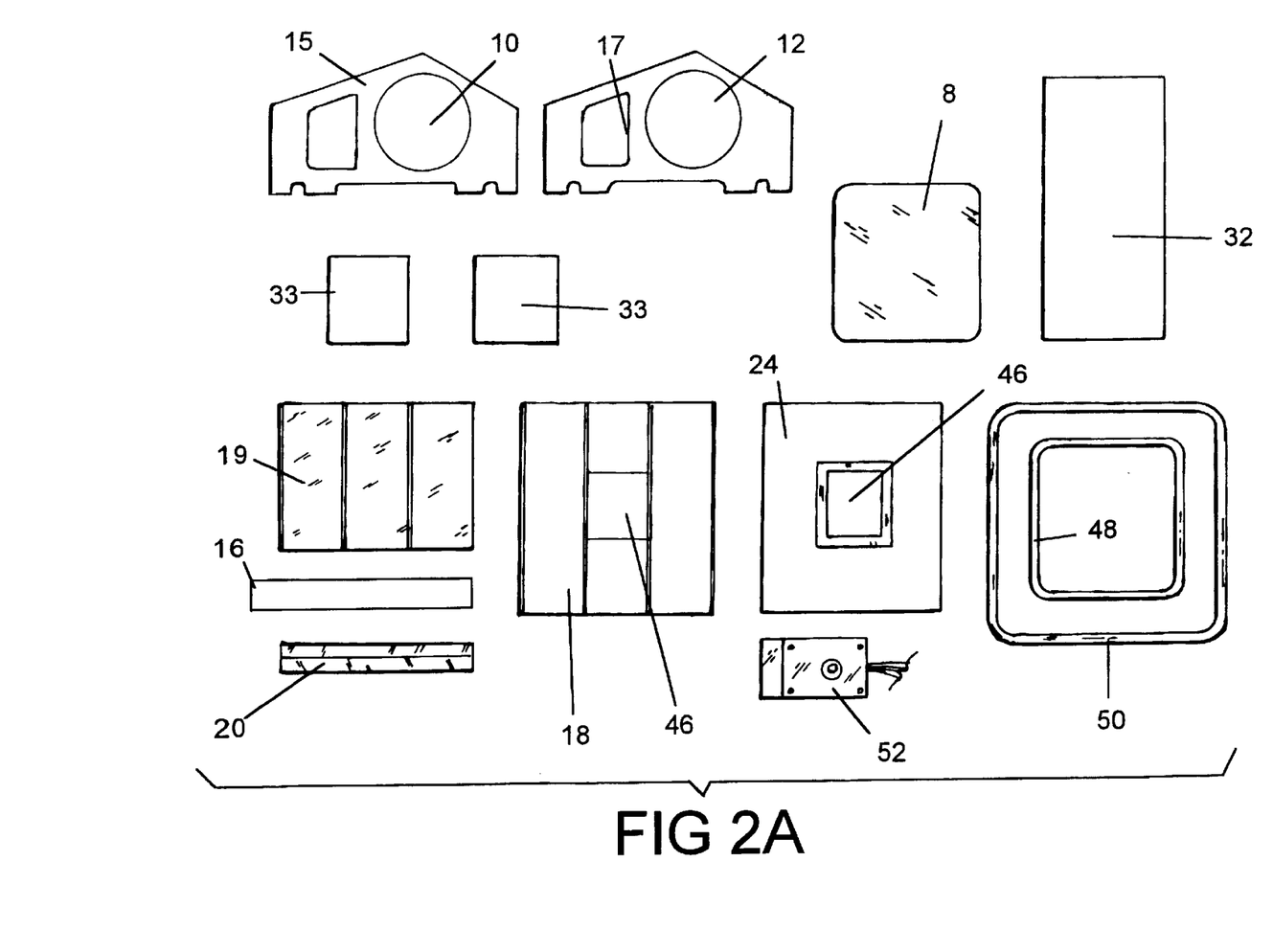
FIG. 2A is a view of the main subcomponents of this invention.

FIG. 2A is a picture of all the components in a solar feeder. The dimensions, as well as the function of each components is described as follows:

Component 16 consists of several ½ inch wide by 12 to 14 inch long strips of copper foil tape. These strips are applied to the edges of the plywood roof.

Component 18 is the raised seam copper roof for the hinging side of the roof. It consists of four pieces of interlocking 12 oz copper, two outside (longer) pieces and two inside (smaller) pieces. The hole in the center is for a sky light opening 46 in the hinging side 22 of the roof 14.

Component 24 is the plywood for the hinging side 22 of the roof 14.

Component 18 is glued to component 24 after the copper foil (component 16) is wrapped around its edges.

Components or perches 48 and 50 are the copper tubes that deliver the shock to the squirrel. Two wires from an electronics unit attach to these tubes, one wire to each tube. Component 48, however, is also part of the feed tray 8.

Component 20 is the ridge cap. It attaches to the hinging side of the roof 14 and when the roof is closed, the ridge cap 20 covers the seam between the hinging and the non-hinging sides of the roof.

Screws, washers and wires are necessary to assemble the solar feeder 2.

Component 52 is the electronics unit. It connects to a solar panel 58, a battery holder 62 and an electronic circuit board 56 housed in a plastic enclosure, and a tin mounting bracket.

Exterior front panel 15, rear panel 17 and side panels 33 are also shown.

The dimensions of the feeder are as follows:

Front/back=14 inches by 10⅛ inches (at peak).
Side=6½ inches by 6⅜ inches.
Hinged Roof (wood)=8 inches by 10⅞ inches.
(Copper)=11½ inches by 10 inches.
Non-Hinged Roof (wood)—8 inches by 7⅝ inches.
(Copper)=8⅛ inches by 10 inches.

Outer Tube=11⅛ inches by 13½ inches.
Inner Tube=6½ inches by 9½ inches.

Figure 2B:
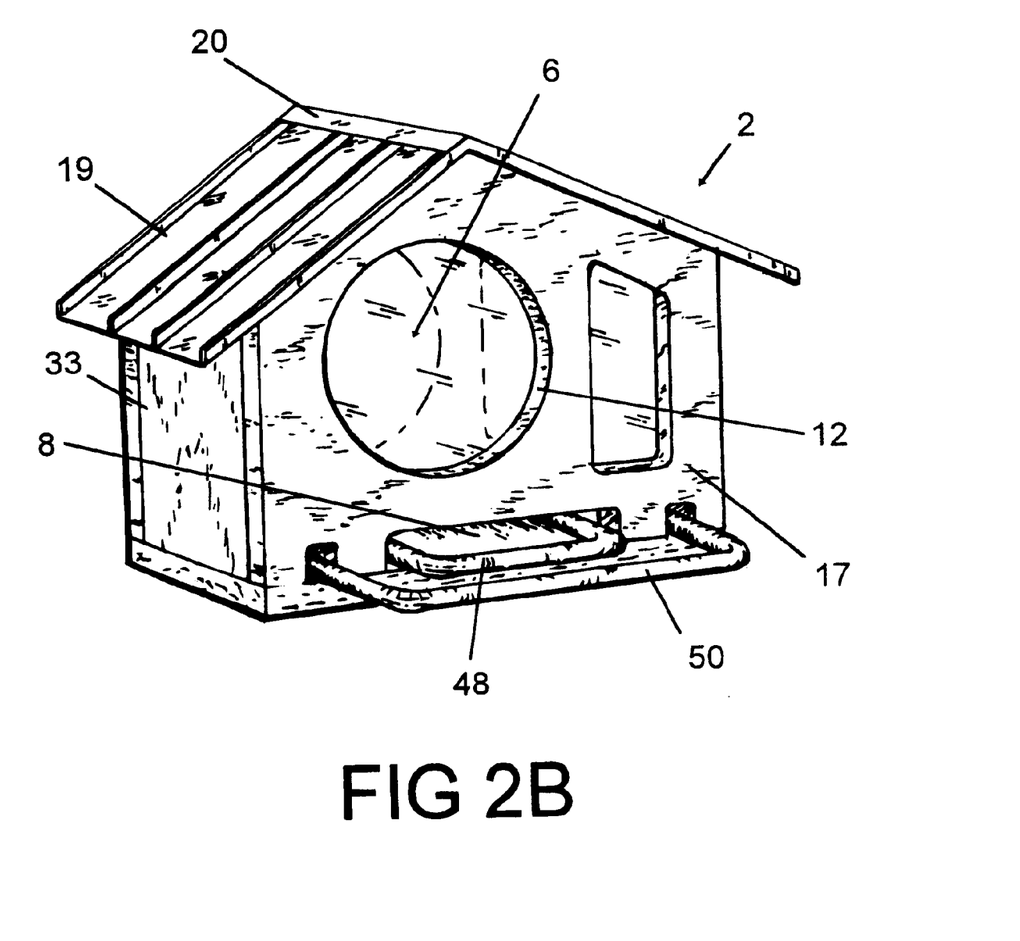
FIG. 2B is a front view of the bird feeder.

The solar feeder 2 is a new type of electronic "squirrel proof" bird feeder. It utilizes solar power as well as a single D cell 60 for low light situations. The design of this feeder 2 takes advantage of the fact that birds have much less moisture in their bodies than squirrels and therefore birds aren't very good conductors of electricity. Squirrels have more moisture in their bodies and therefore a much lower threshold of conductivity. The charge produced by the feeder is administered via the two copper tubes 48, 50 as seen in FIG. 2B. The roof 14 as well can deliver the electronic pulse if a squirrel comes in contact with the inner copper tube 48/fee tray 8 as wall as the roof 14. The copper tubes were designed to be too far apart for a birds legs to straddle but in the rare event they do, the charge produced is too low for birds to feel. (Even wet birds!) A squirrel, however, has no choice but to straddle both tubes 48, 50, or the inner tube 48/feed tray 8 and the roof 14, thus completing the circuit. These tubes 48, 50 start out as one straight piece of ⅜ copper pipe and are bent into their present shape, so that they are continuous from one end to the other. These tubes 48, 50 could also be made of any conductive material and could be in the form of a wire or a small ledge or platform with the conductor mounted on it. The outer tube 50 is electronically insulated from the feeder so moisture can't create a path between the two tubes and drain the unit. The feed tray 8 is electrically insulated from the rest of the feeder as well. The charge is delivered by a capacitor C1 and is sufficiently stepped down so it cannot harm squirrels or humans.

Figure 3:
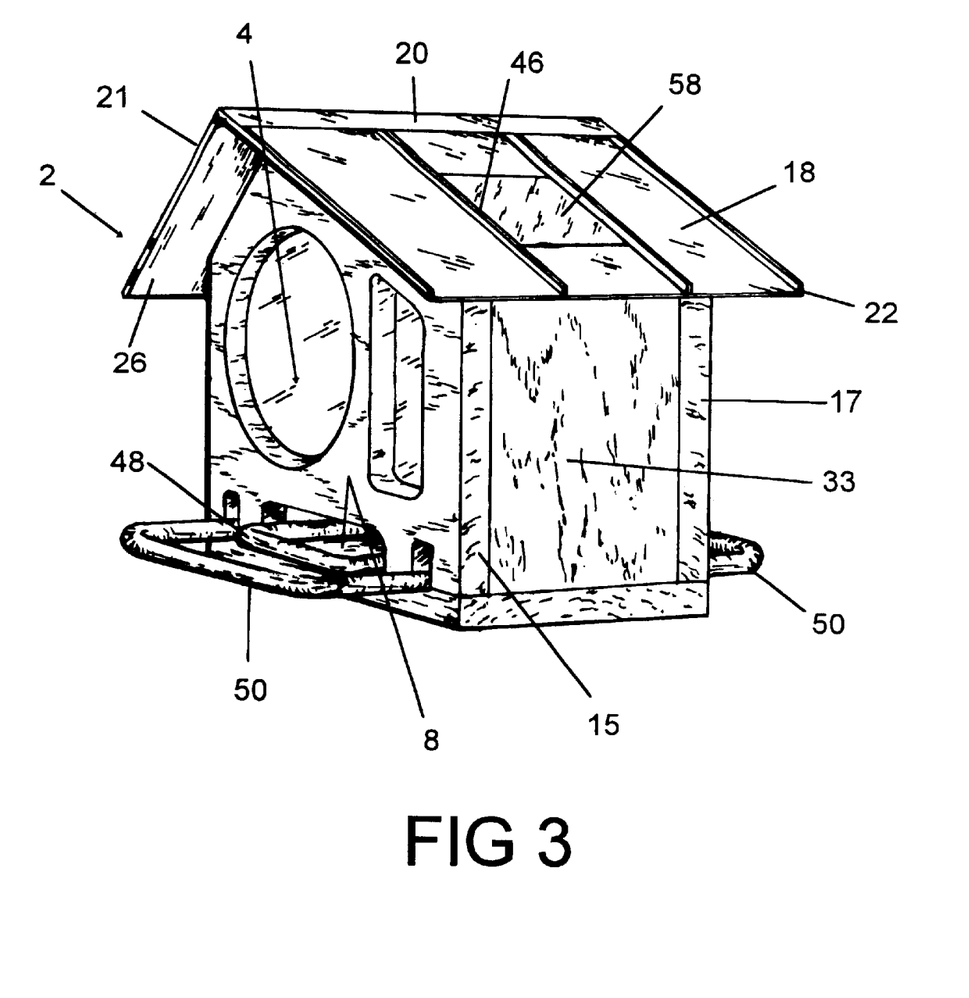
FIG. 3 shows the location of the solar panel and electronics unit.

As shown in FIG. 3, the solar panel 58 and the electronic unit are mounted underneath the sky light 46. This keeps them both protected from the elements and they should remain virtually maintenance free except for occasional battery replacement. The solar feeder 2 was designed to feed from two sides. This allows the installer to face the solar panel as close to due south as possible. It should be mentioned that the 1 Volt, 1 Amp, 1 Watt solar panel 58 doesn't require direct sunlight. The solar panel only requires ambient or indirect sun light. It should also be stated that the bottom of the feed tray 8 is made from tin and is electrically connected to the inner tube 48. This prevents a squirrels from standing in the tray while avoiding the inner tube 48.

Figure 4:
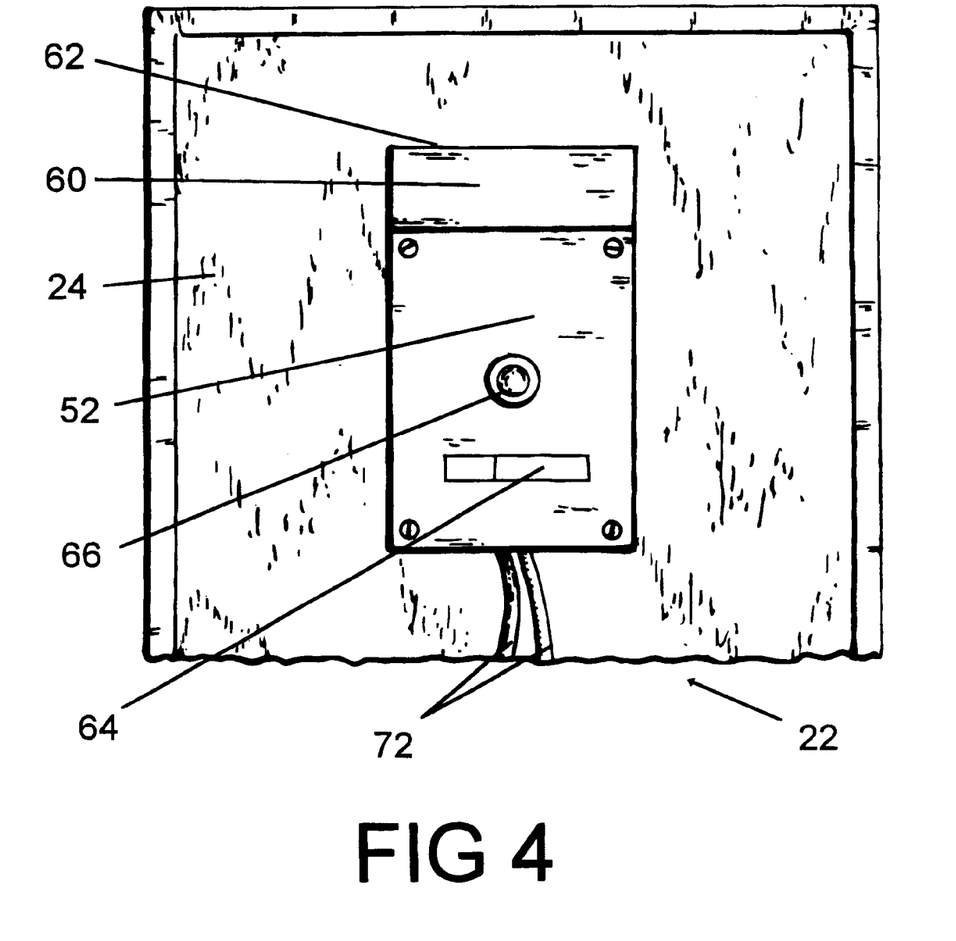
FIG. 4 shows the modular electronics located on the inside of the bird feeder roof.

As shown in FIG. 4 one side 22 of the roof 14 hinges open for easy access to the electronics 52 and the battery holder 62. This is also how seed is deposited. The Solar Feeder 2 can hold approximately six (6) quarts of sunflower seed. The electronic unit 52 is designed to be completely modular, by removing four (4) screws and two (2) butt splices. In can be removed or replaced if servicing is needed. The unit itself has two (2) switches, one is a simple on/off rocker switch 64. The other is a momentary push-button switch 66. By holding down the momentary test switch and observing how long the red LED stays illuminated you can determine if the feeder 2 is charged as well as the level of battery charge.

As shown in FIG. 3 there is also a copper ridge cap 20. This was designed to keep rain out of the seed compartment. There is also a hole in the ridge cap that closes over a small eye bolt (not shown) mounted on the non-hinging side 21 of the roof 14. This ridge cap 20 acts as a rain barrier for the seam between the hinging side 22 and the non-hinging side 21 of the roof 14 as well as a latching mechanism to keep squirrels from climbing inside the feeder. The ridge as well as the top of the roof is covered with heavy gauge copper. The roof itself is made from one half inch exterior grade plywood and is trimmed out in copper foil. The front and back windows 10, 12, as well as the solar sky light 46 can be made from 3/16 inch plexy.

After hand assembly, the cedar is dipped in a UV resistant treatment. The feeder 2 is nailed and glued and screwed together with a water resistant glue and galvanized screws and nails and the Solar Feeder is designed to resist the elements for years to come.

Figure 5A:
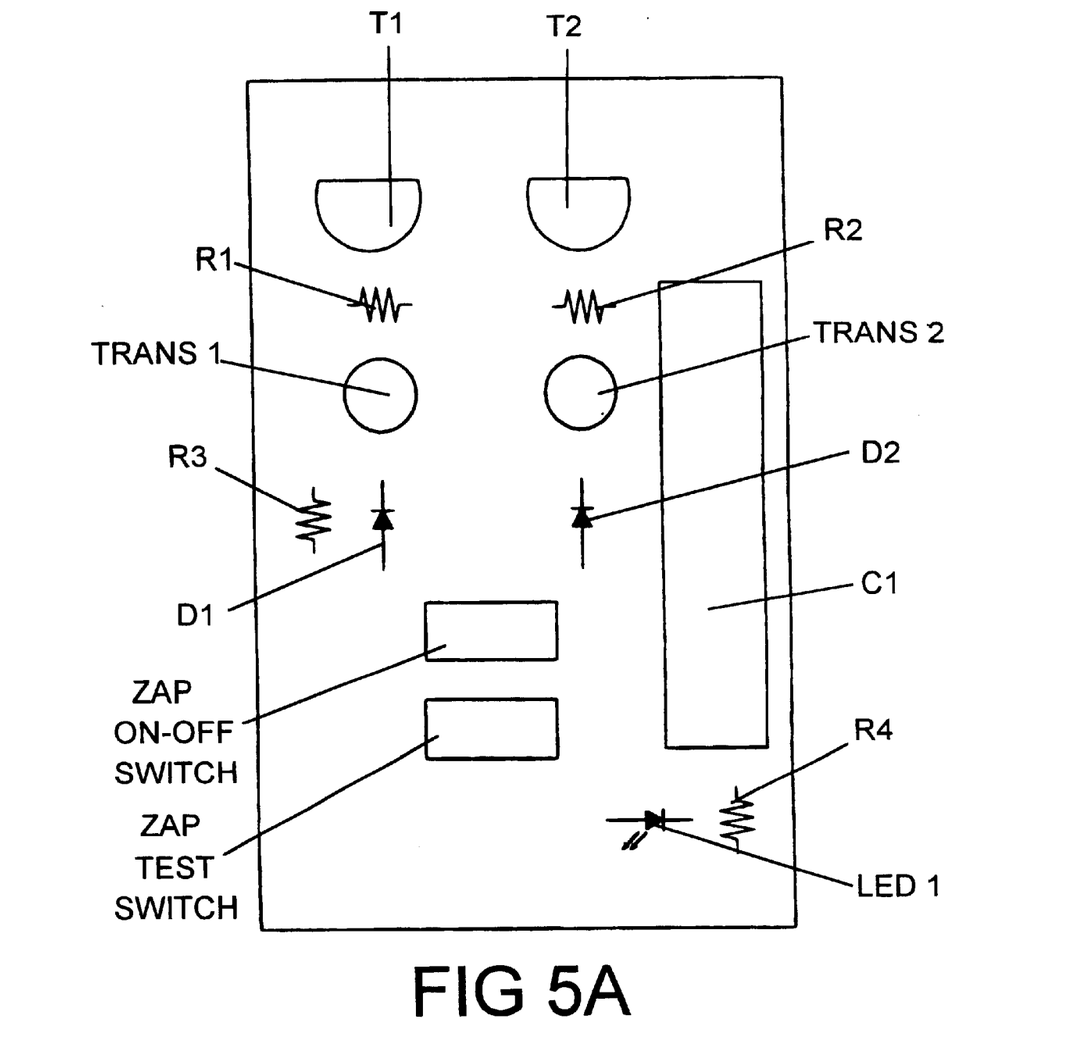
FIG. 5A is a view of the circuit component layout.

FIG. 5A is a diagram that describes in detail the circuit component layout for the Solar Feeder electronics unit. All components are listed and their appropriate values or designations are listed in Table 1 as follows:

TABLE 1

| Transistors T1 and T2 | ECO 11 |
|---|---|
| Resistors R1 and R2 | 82 ohms |
| Resistor R3 | 10 ohms |
| Diodes D1 and D2 | DN4007 |
| Resistors R4 | 10 K ohms |
| Capacitor C1 | 330 volt/160 micro farads |

Figure 5B:
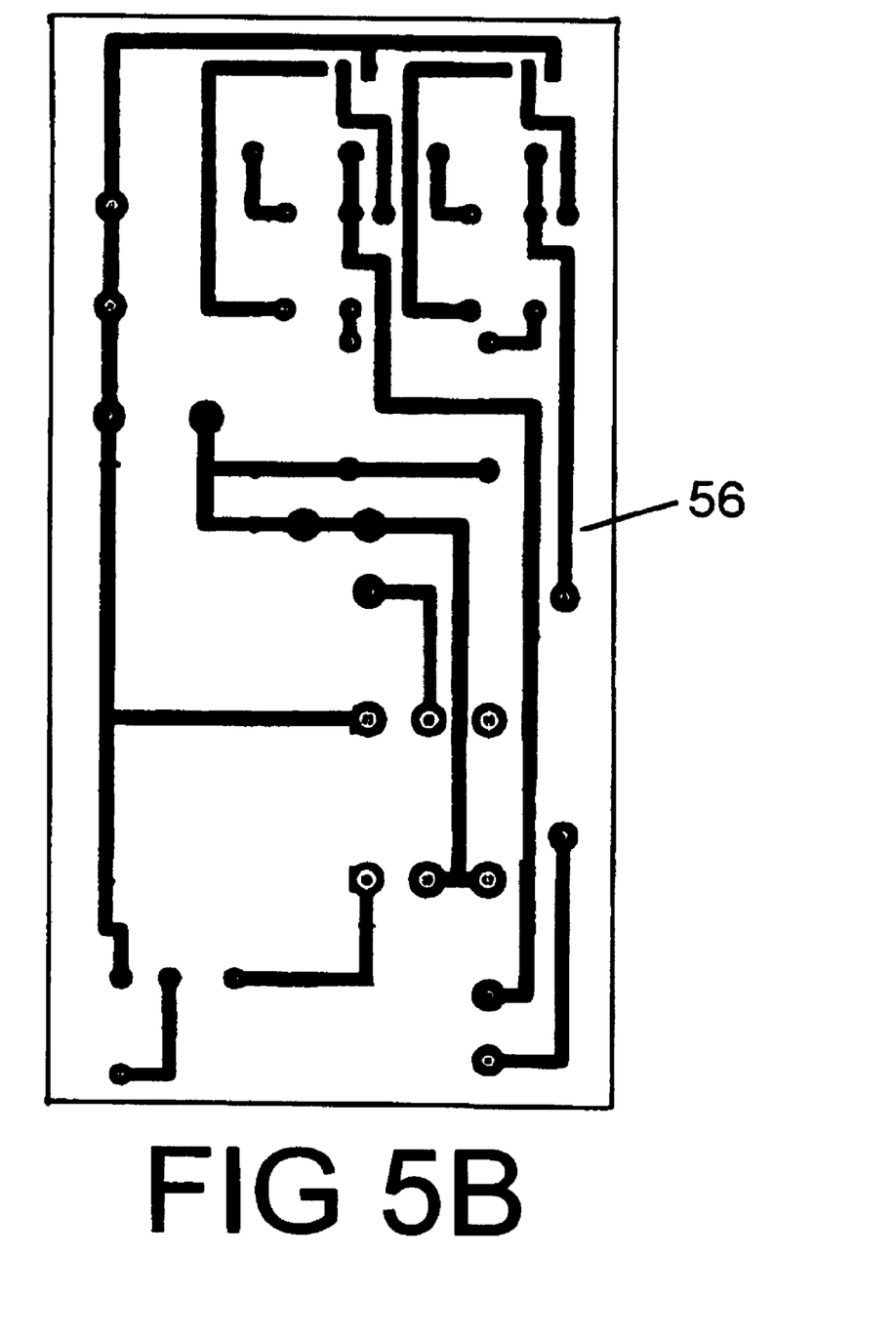
FIG. 5B is a view of a circuit diagram.

FIG. 5B is a solar feeder circuit trace diagram. This figure shows the circuit trace diagram for the Solar Feeder electronics unit. This is how the actual circuit traces appear on the back of the circuit board 56.

Figure 5C:
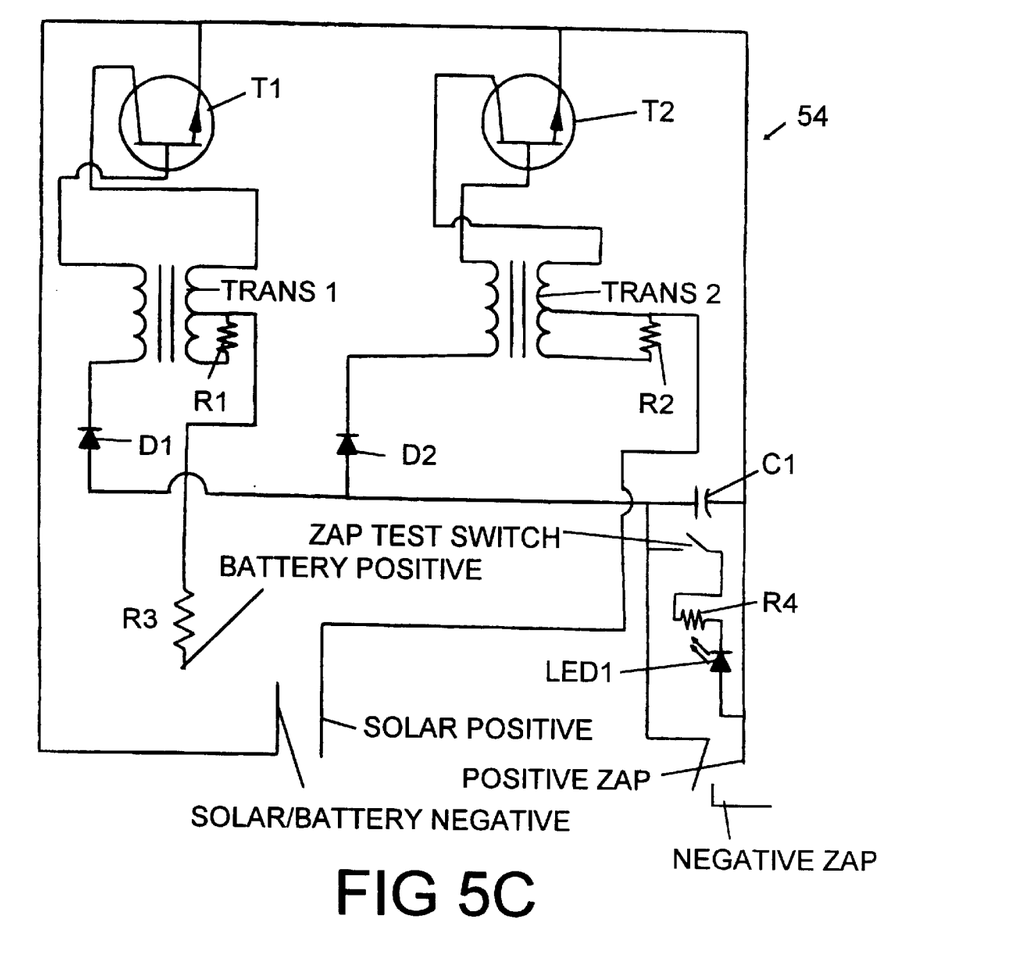
FIG. 5C is a view of the circuit trace diagram of the printed circuit board.

FIG. 5C is a solar feeder circuit diagram. FIG. 5C is the circuit diagram for the Solar Feeder electronics unit 52. All components are labled and the component values or designations are listed in Table 1.

Figure 6:
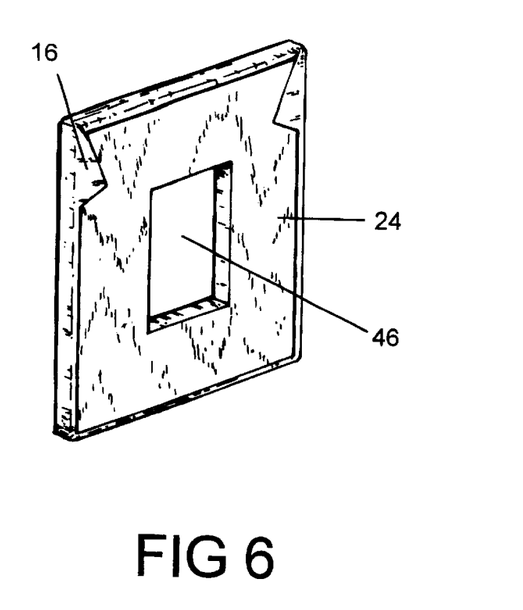
FIGS. 6–17 show the assembly steps for fabricating the bird feeder.
Figure 7:
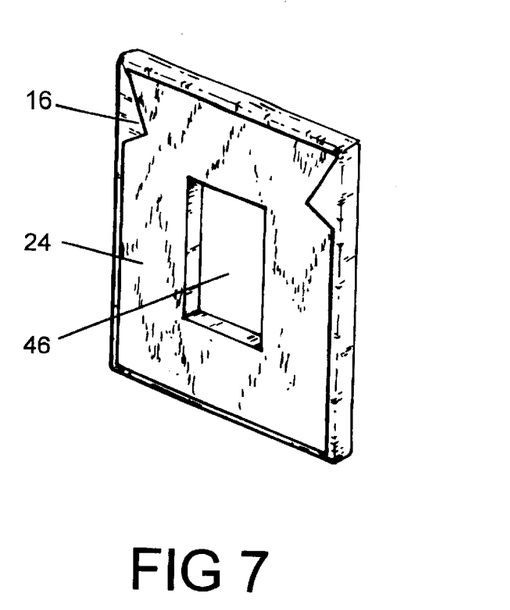

The roof/raised seam copper/copper foil is shown in FIGS. 6 and 7. As shown in FIG. 6 the copper foil is wrapped around all four edges of the roof. The foil 16 is functional as well as aesthetic. The foil insures an electrical contact between the hinging side 22 of the roof and the non-hinging side 21 of the roof 14 whenever the roof is closed. The dimensions of the plywood shown in FIG. 6 are roof length +10¾ inches; roof width=7¾ inches; and plywood thickness=7/16 inch.

In FIG. 7 the foil 16 on the angled edge of the roof overlaps onto the top of the plywood. This insures an electrical contact between the raised seam copper and the foil. The foil dimensions are: foil length=12 inches and foil width=1 inch.

Figure 8:
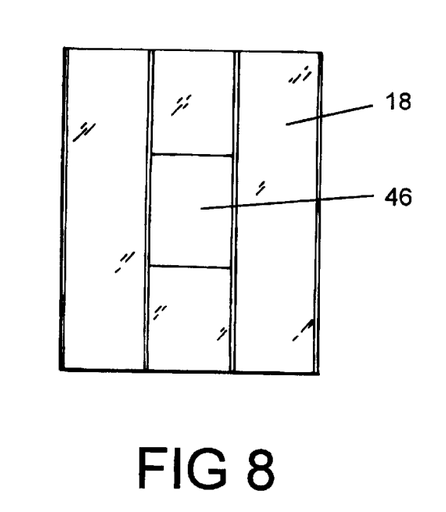

FIG. 8 shows the raised seam copper 18. The four pieces of tongue and groove raised seam copper is dry fitted before being glued to the plywood. The hole in the center is for the solar skylight 46. The raised seam copper dimensions are: overall length=11⅜ inches; overall width=10 1/16 inches. The solar skylight dimensions are: length=4⅝ inches; width=3¼ inches.

Figure 9:
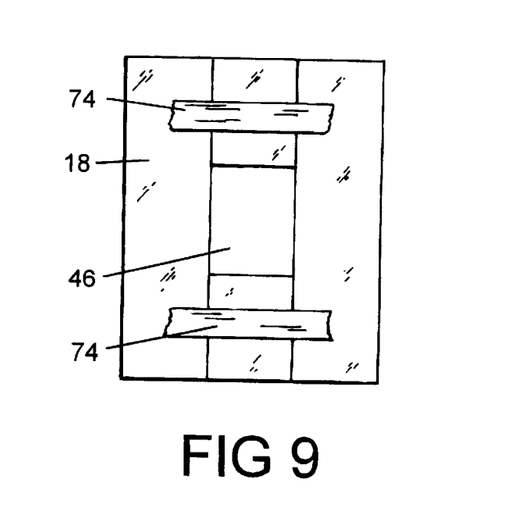

FIG. 9 shows the method of attaching the raised seam copper roof 18. Prior to gluing, the raised seam panels are flipped and tape 74 is applied so the panels do not move while the glue is drying.

Figure 10:
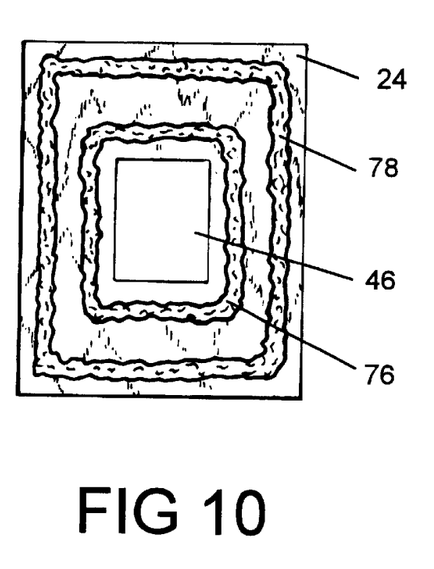

FIG. 10 shows the gluing of the raised seam panels. As shown in FIG. 10, two beads of glue 76, 78 are used. The outer bead 78 is approximately ¾ of an inch away from the edge of the plywood. The inner bead 76 is flush with the inside edge of the skylight opening 46. When the copper panels 18 are applied, the inner bead 76 is allowed to ooze onto the skylight opening 46. After the glue dries, the excess is cut away. This insures a water proof seal around the opening 46.

Figure 11:
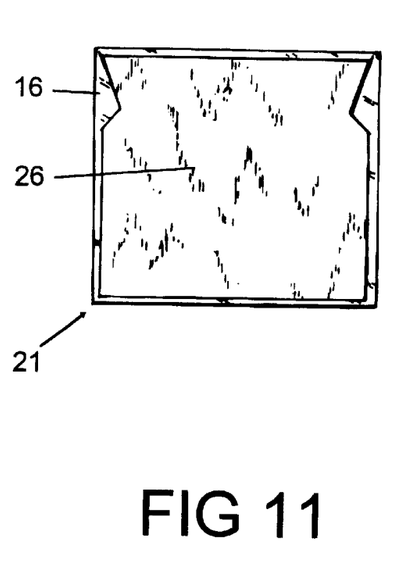

FIG. 11 shows the non-hinging roof 21 including plywood 26 and foil 16. The previous five taping and gluing methods are repeated for the non-hinging side 21 of the roof 14.

Figure 12:
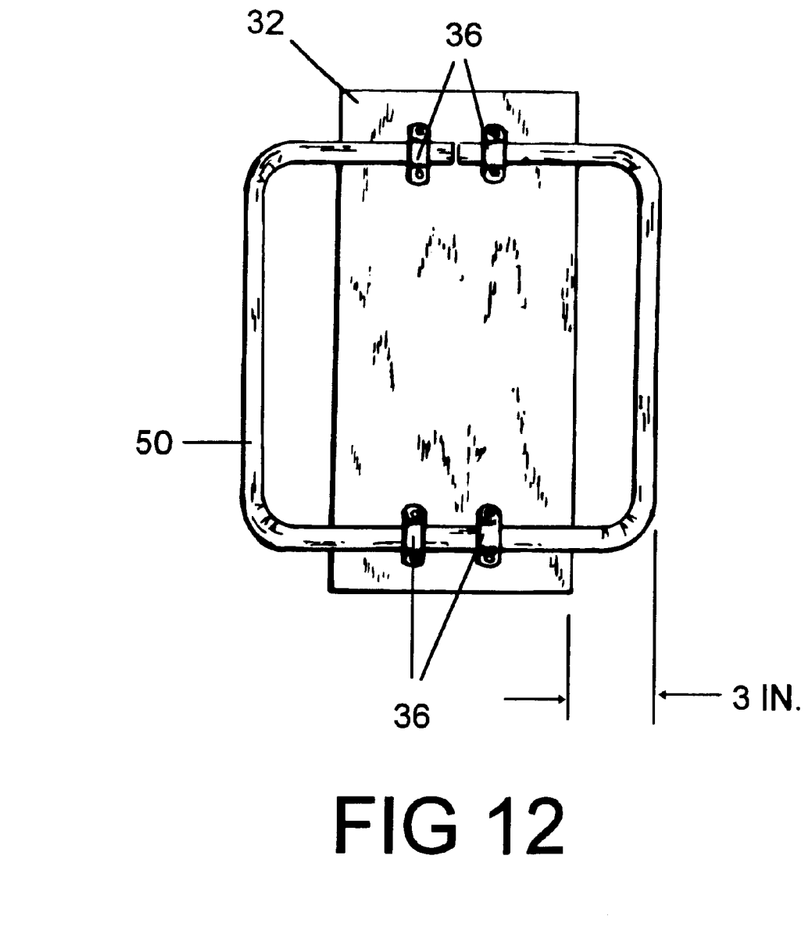

FIGS. 12–17 show the assembly of the cooper tube/inner tray. FIG. 12 shows the outer tube 50. FIG. 12 shows the ⅜ inch outer tube 50 attached to the cedar bottom 32. The distance between the edge of the bottom and the inside of the outer tube is approximately 3 inches. The tube is attached to the bottom using plastic (nonconductive) clamps 36. These clamps 36 elevate the tube approximately 1/16 inch off the cedar bottom 32. The dimensions of the outer tube are 11 1/8 inches by 13 3/4 inches. The dimensions of the cedar bottom are 6 1/2 inches by 14 inches.

Figure 13:
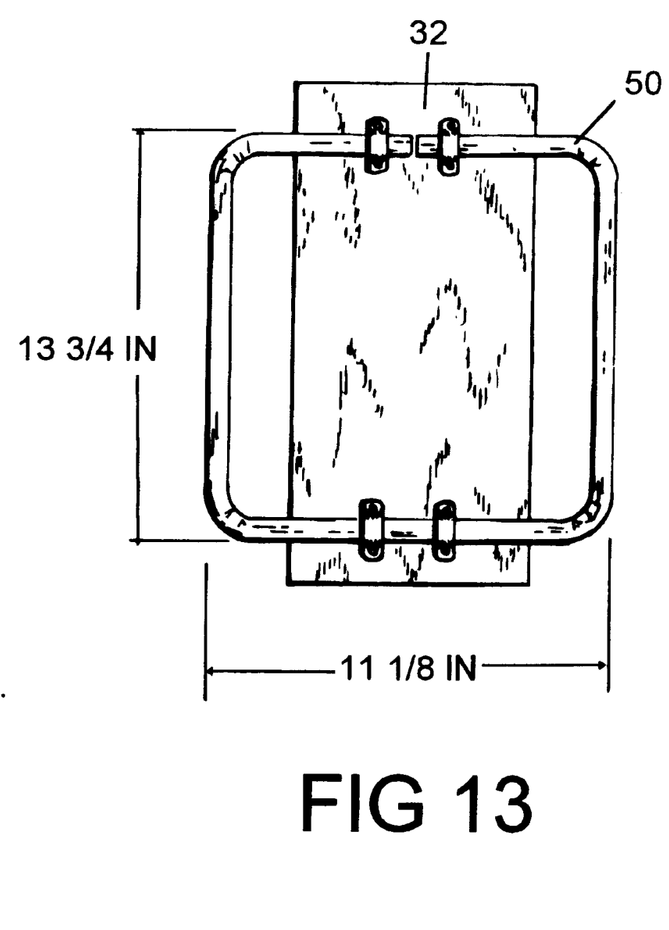

FIG. 13 also shows the outer tube 50. The side to side dimensions are also important. It is crucial that the pipes do not come into contact with the cedar when they protrude out the front and back of the feeder. This helps prevent the feeder form shorting out whenever it becomes wet.

Figure 14:
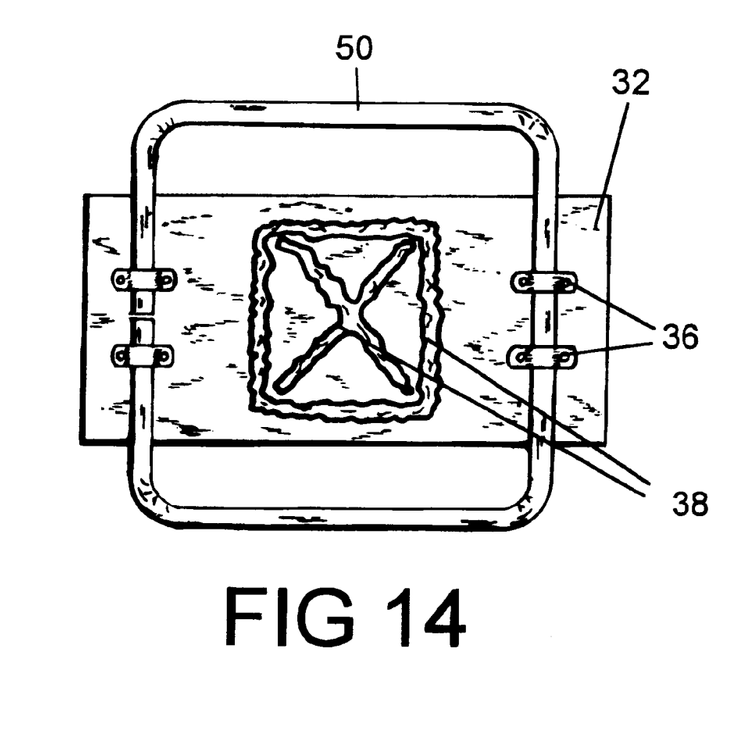

FIG. 14 shows the preparation of the bottom for the inner tray. In FIG. 14, caulk 38 is applied to the center of the cedar bottom 32 and allowed to dry. This creates an insulating bed for the inner tray assembly 8 to rest on. Again it is crucial to keep the tray insulated from the cedar so that it will not short out when the feeder becomes wet or saturated. Once the caulk 38 has dried, the inner tray is also attached using nonconductive plastic clamps 34. The distance from the edge of the cedar bottom to the outer edge of the inside tube is 3 7/8 inches.

Figure 15:
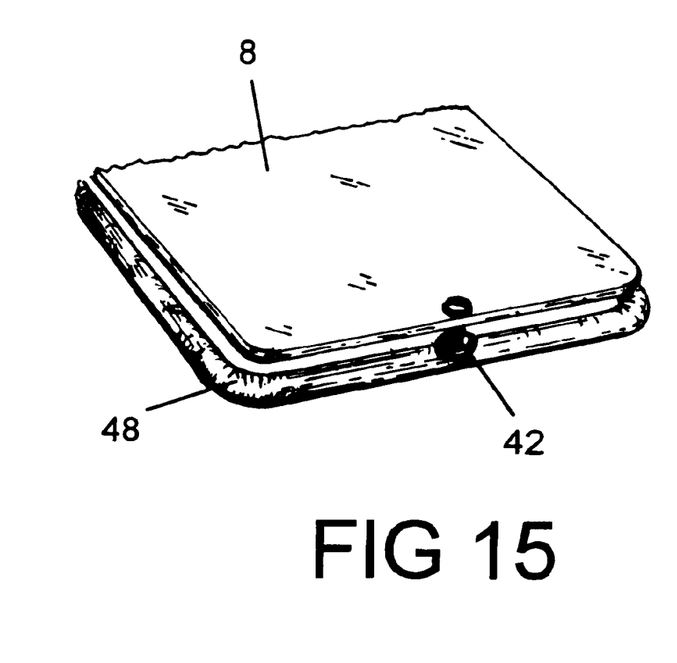

FIG. 15 shows the inner tube and tray assembly. In FIG. 15 the tin tray 8 is being attached to the inner copper tube 48. The tray is attached using one screw 42 and one washer 44 on both ends of the inner tube.

Figure 16:
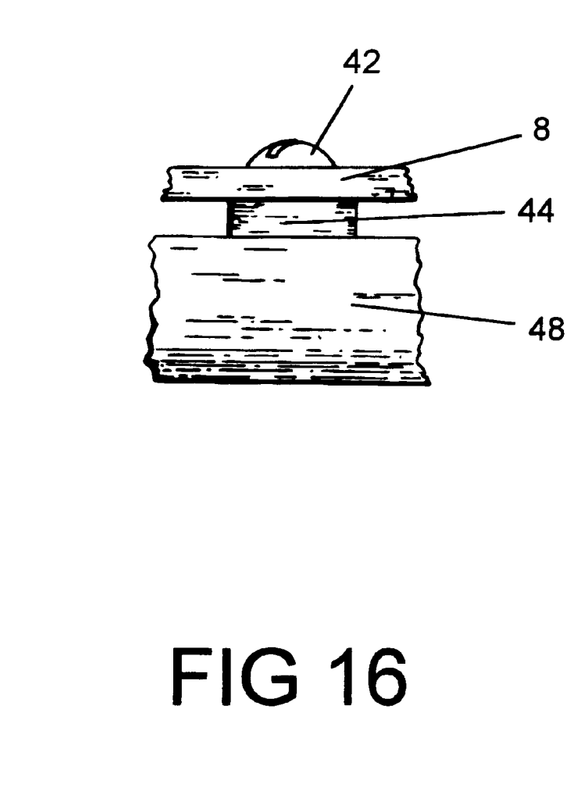

FIG. 16 shows the inner tube and tray assembly. In FIG. 16 note the washer 44 between the tray 8 and the copper tube 48. The washer is approximately 3/16 of an inch wide. It insures that a gap is maintained between the tube and the tray. This gap allows water to drain from the feed tray. This is important because it prevents mold from growing on the seed which could in turn harm the birds.

Figure 17:
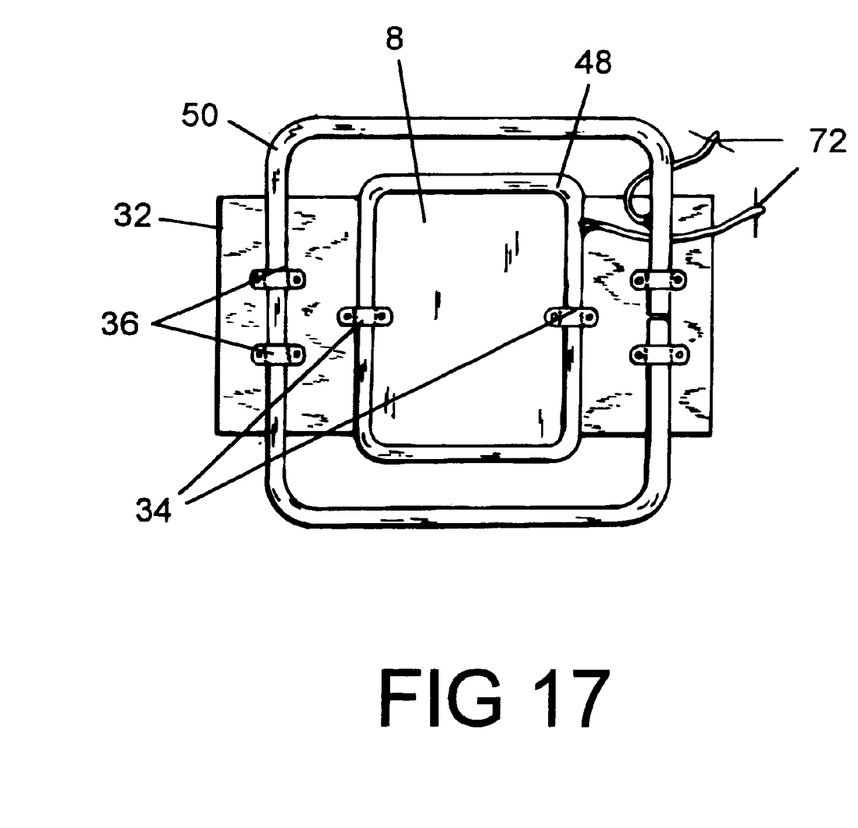

FIG. 17 shows the completed cedar bottom 32 and tube assembly. FIG. 17 shows the completed bottom. Note that the tubes are attached using plastic clamps 34, 36. The distance between the inner tray and the outer tube is crucial. It is designed to be too close together for a squirrel to climb between them. Also not the two wire leads 72. These leads will feed through the seed diverter and attach to the solar electronics unit which is mounted on the hinging side 22 of the roof 14. The inside tube/feed tray 8, 48 is connected to the negative lead coming from the electronics unit 52. The outer tube 50 as well as the roof 14 are connected to the positive side of the electronics unit 52.

I claim:

1. A bird feeder comprising:
   a seed compartment fabricated from an electrically nonconductive material;
   a feed tray located at the bottom of the seed compartment, the feed tray comprising means for collecting seed in the seed compartment and for providing access for birds to eat the seed;
   two spaced apart electrically conductive members positioned adjacent to the feed tray and positioned to each provide a perch for a bird as the bird eats the seed in the seed tray, the conductive members being spaced apart by a distance sufficient so that one of the spaced apart electrically conductive members can support a bird, but being spaced close enough so that a squirrel would contact both electrically conductive members;
   a source of electrical energy connected to at least one of the spaced apart electrically conductive members comprising means for establishing a voltage difference between the two electrically conductive members, the voltage being sufficient to deliver an electrical shock to a squirrel contacting both spaced apart electrically conductive members.

2. The bird feeder of claim 1 wherein the voltage between the two spaced apart electrically conductive members is insufficient to deliver an electrical shock to a bird contacting both electrically conductive members because of a lower moisture content of a bird than a squirrel.

3. The bird feeder of claim 1 wherein the two spaced apart electrically conductive members comprise metal tubes.

4. The bird feeder of claim 1 wherein the two spaced apart electrically conductive members each comprise an enclosed loop protruding from opposite sides of the seed compartment.

5. The bird feeder of claim 1 wherein at least one of the electrically conductive members is electrically isolated from the seed compartment.

6. The bird feeder of claim 1 wherein the seed compartment is fabricated from wood.

7. The bird feeder of claim 1 wherein the source of electrical energy comprises a solar panel.

8. The bird feeder of claim 7 wherein the source of electrical energy includes a capacitor connected to the solar panel.

9. The bird feeder of claim 7 wherein the solar panel is located above the seed compartment.

10. The bird feeder of claim 1 wherein an electrically conductive roof is located on top of the seed compartment, the electrically conductive roof also being connected to the source of electrical energy.

11. The bird feeder of claim 10 wherein the two spaced apart electrically conductive members comprise an inner tube and an outer tube, the outer tube being maintained at an electrical potential that is greater then the electrical potential of the inner tube.

12. The bird feeder of claim 11 wherein the electrically conductive roof is maintained at substantially the same electrical potential as the outer tube.

\* \* \* \* \*